(12) United States Patent
Sachdev et al.

(10) Patent No.: US 9,783,865 B2
(45) Date of Patent: Oct. 10, 2017

(54) THERMAL-ASSISTED ROLL FORMING OF HIGH STRENGTH MATERIAL

(71) Applicant: GM GLOBAL TECHNOLOGY OPERATIONS LLC, Detroit, MI (US)

(72) Inventors: Anil K. Sachdev, Rochester Hills, MI (US); John E. Carsley, Oakland, MI (US); Stuart J. Brown, Flint, MI (US); Louis J. Conrad, Attica, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 498 days.

(21) Appl. No.: 14/256,045

(22) Filed: Apr. 18, 2014

(65) Prior Publication Data
US 2015/0299818 A1    Oct. 22, 2015

(51) Int. Cl.
| C21D 8/02 | (2006.01) |
| C22F 1/04 | (2006.01) |
| C22F 1/00 | (2006.01) |
| C21D 9/46 | (2006.01) |
| C21D 1/18 | (2006.01) |

(Continued)

(52) U.S. Cl.
CPC ......... C21D 8/0263 (2013.01); B62D 29/007 (2013.01); C21D 1/18 (2013.01); C21D 9/46 (2013.01); C21D 9/52 (2013.01); C22C 21/00 (2013.01); C22C 21/12 (2013.01); C22C 38/00 (2013.01); C22F 1/002 (2013.01); C22F 1/04 (2013.01); C21D 1/673 (2013.01); C21D 7/02 (2013.01); C21D 7/13 (2013.01); C21D 2211/002 (2013.01); C21D 2211/008 (2013.01)

(58) Field of Classification Search
CPC .......... B62D 29/007; C21D 1/18; C21D 9/46; C22C 21/00; C22C 38/00; C22F 1/002; C22F 1/04
See application file for complete search history.

(56) References Cited

U.S. PATENT DOCUMENTS 4,503,116 A * 3/1985 Lapidus ............... A61K 6/0026
                                                     156/272.2
5,359,872 A * 11/1994 Nashiki ................... B21D 5/00
                                                     219/121.62
(Continued)

FOREIGN PATENT DOCUMENTS

| CN | 101664873 A | 3/2010 |
| CN | 102699245 | 10/2012 |
| CN | 102939221 | 2/2013 |

OTHER PUBLICATIONS

Chinese Office Action dated Aug. 22, 2016 for related Chinese Patent Application No. 201510183793.X.

(Continued)

*Primary Examiner* — Colleen Dunn
(74) *Attorney, Agent, or Firm* — Mickki D. Murray; Parks IP Law LLC

(57) ABSTRACT

A thermal-assisted method deforms plastically a high-strength material using a high-intensive heat source. The high-strength material may be a cold-rolled sheet aluminum of strength greater than 300 megapascal (MPa) or a cold-rolled sheet steel of strength greater than 1000 MPa. The cold-rolled sheet metal is heated just before bending to a temperature near or above the critical temperature for the material and is followed by rapid quenching after bending.

20 Claims, 4 Drawing Sheets

(51) Int. Cl.
*C22C 21/00* (2006.01)
*C22C 38/00* (2006.01)
*B62D 29/00* (2006.01)
*C21D 9/52* (2006.01)
*C22C 21/12* (2006.01)
*C21D 7/02* (2006.01)
*C21D 7/13* (2006.01)
*C21D 1/673* (2006.01)

(56) References Cited

U.S. PATENT DOCUMENTS

| | | | | |
|---|---|---|---|---|
| 5,542,995 A | * | 8/1996 | Reilly | C21D 9/64 |
| | | | | 148/598 |
| 6,601,426 B2 | * | 8/2003 | Wegener | B21D 25/02 |
| | | | | 219/121.63 |
| 6,622,540 B2 | * | 9/2003 | Jones | B21D 11/10 |
| | | | | 72/11.2 |
| 6,813,923 B2 | * | 11/2004 | Jones | B21D 11/10 |
| | | | | 72/16.2 |
| 7,231,798 B2 | * | 6/2007 | Zhang | B21D 7/00 |
| | | | | 72/128 |
| 7,254,977 B2 | * | 8/2007 | Machrowicz | B21C 37/065 |
| | | | | 72/201 |
| 7,290,423 B2 | * | 11/2007 | Carsley | B21D 39/02 |
| | | | | 72/128 |
| 7,574,888 B2 | * | 8/2009 | Horita | B21C 23/001 |
| | | | | 148/558 |
| 8,316,683 B2 | * | 11/2012 | Tomizawa | B21D 7/08 |
| | | | | 72/128 |
| 8,391,214 B2 | * | 3/2013 | Carpelan | H04W 16/00 |
| | | | | 370/328 |
| 2001/0004910 A1 | * | 6/2001 | Yasuhara | C21D 8/0226 |
| | | | | 148/546 |
| 2002/0100308 A1 | * | 8/2002 | Wegener | B21D 25/02 |
| | | | | 72/295 |
| 2006/0065035 A1 | * | 3/2006 | Zhang | B21D 7/00 |
| | | | | 72/342.5 |
| 2010/0086803 A1 | * | 4/2010 | Patberg | B21C 37/08 |
| | | | | 428/595 |
| 2010/0088882 A1 | * | 4/2010 | Tomizawa | B21D 7/08 |
| | | | | 29/564.1 |

OTHER PUBLICATIONS

Chinese Office Action dated Apr. 12, 2017 for corresponding Chinese Patent Application No. 201510183793.X.

\* cited by examiner

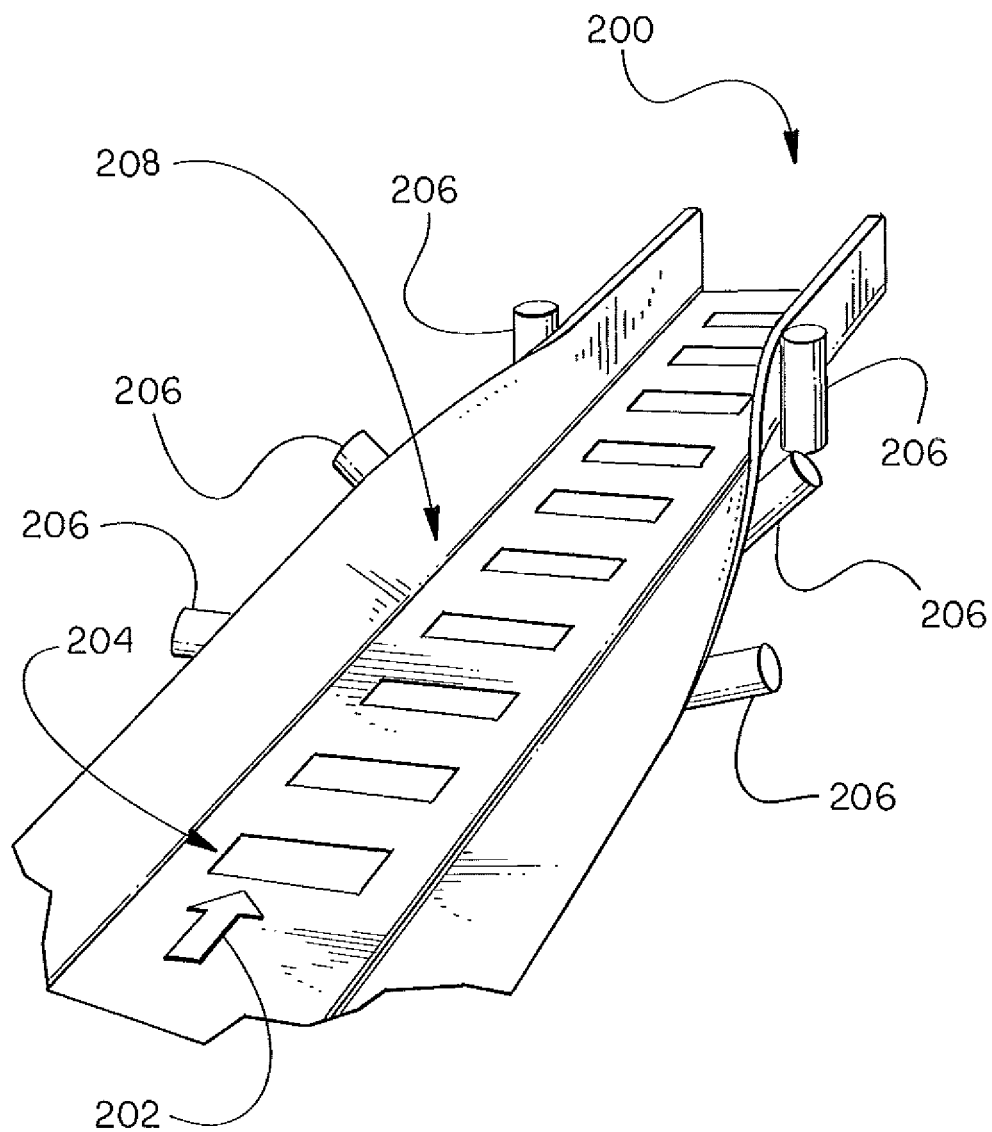

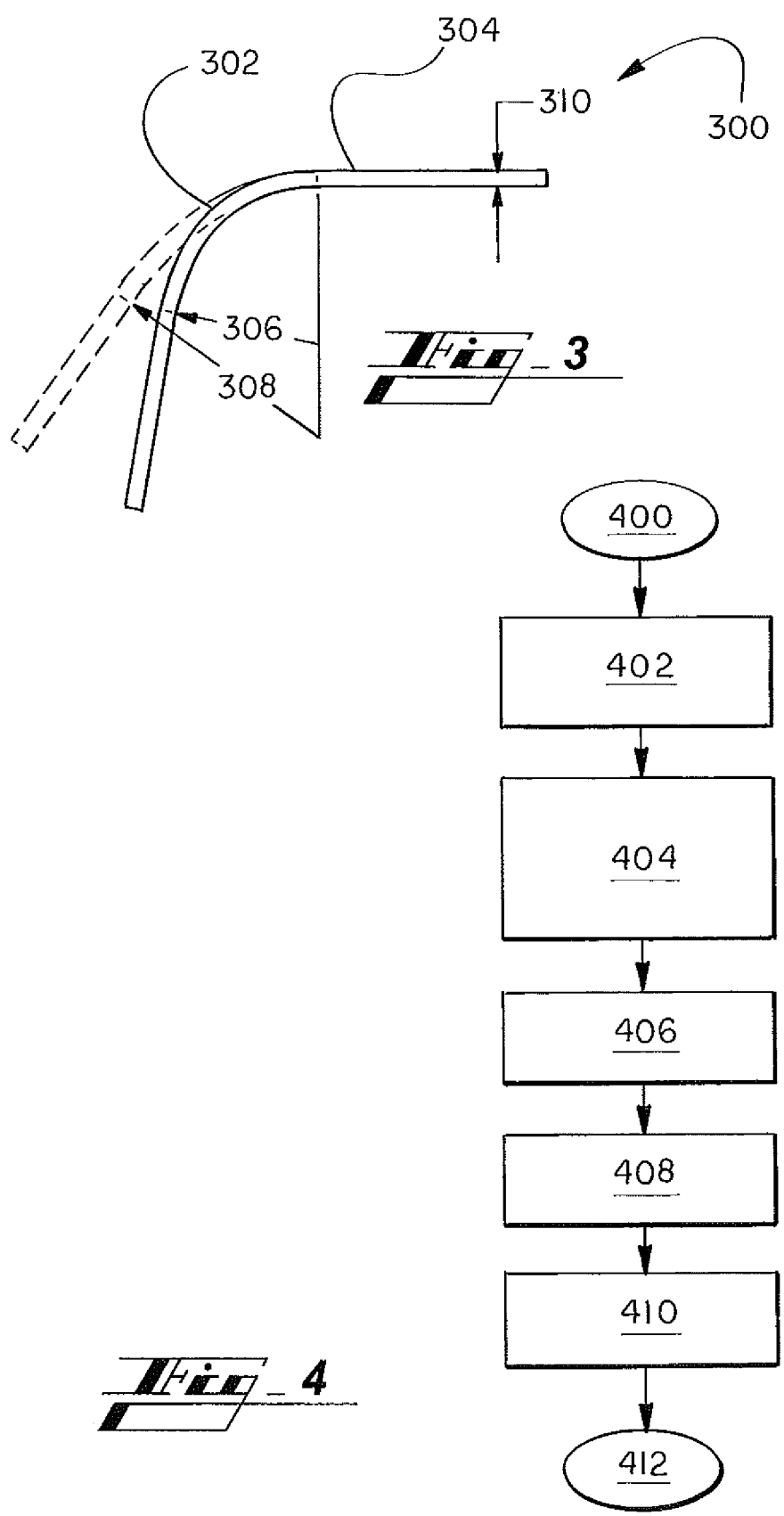

US 9,783,865 B2

THERMAL-ASSISTED ROLL FORMING OF HIGH STRENGTH MATERIAL

FIELD OF THE PRESENT TECHNOLOGY

The present technology relates generally to sheet metal forming and, more specifically, the present technology relates to a heat-assisted metal forming process.

BACKGROUND OF THE PRESENT TECHNOLOGY

Roll forming at a production facility is normally done at room temperature using a series of progressively different rollers to bend and plastically deform a sheet material into a desired form. The process is continuous and at high speed and the result is a sheet material bent into a particular profile for a particular purpose.

Future products are, however, being designed with higher strength materials, while sophisticated computer analysis is driving profile designs with increasingly greater complexity often demanding sharp corners that are also high-strength. These two factors work counter to each other and regions subjected to the large strains fracture when bending high-strength materials.

The present technology is directed primarily to a system and method that enables high speed plastic deformation of high-strength materials that are generally associated with low ductility, for example less than 10% total elongation as measured in a standard tensile test, without negative impact on the property of the resulting product.

SUMMARY OF EMBODIMENTS OF THE TECHNOLOGY

Given the aforementioned deficiencies, a need exists for methods and systems to form the high-strength material through a continuous and high speed process. In one embodiment, the present technology is a process for roll forming of high-strength cold rolled sheet metal. The process comprises continuously feeding high-strength cold rolled sheet metal between rollers on a roll-forming production line, providing intense local heat from a heat source that is targeted at the location that will subsequently become bent upon entering the rollers, heating the cold rolled sheet metal to a temperature within the two-phase sub-critical temperature region or above the critical temperature for producing the high temperature phase, bending the cold rolled sheet metal, and rapidly quenching the cold rolled sheet metal after bending. The rapid quench allows the alloys that demonstrate subsequent precipitation hardening, such as aluminum or magnesium, to retain the high temperature phase structure at room temperature; the high temperature phase will transform upon quenching to room temperature to other higher strength phases, such as retained austenite, martensite, and/or bainite as in the case of steels.

In an alternative embodiment, the present disclosure discloses a rocker for an automobile formed by a thermal-assisted process. The rocker is formed by heating a cold rolled metal sheet to a temperature within the two-phase sub-critical temperature region or above a critical temperature for the cold rolled metal sheet, bending the cold rolled metal sheet to form the rocker, and rapidly quenching the cold rolled metal sheet after bending.

In yet another alternative embodiment, the present disclosure discloses a bumper for an automobile formed by a thermal-assisted process. The bumper is formed by heating a cold rolled metal sheet to a temperature within the two-phase sub-critical temperature region or above the critical temperature for the cold rolled metal sheet, and bending the cold rolled metal sheet to form the bumper, and rapidly quenching the cold rolled metal sheet after bending.

Further features and advantages of the technology, as well as the structure and operation of various embodiments of the technology, are described in detail below with reference to the accompanying drawings. It is noted that the technology is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present technology and, together with the description, further serve to explain the principles of the technology and to enable a person skilled in the relevant art(s) to make and use the technology.

FIG. 2 is another schematic 200 for bending a sheet material according to an alternative embodiment of the present technology.

FIG. 3 is an illustration 300 of a bending angle.

FIG. 4 is a flowchart 400 for a process of bending a sheet material according to the present technology.

DETAILED DESCRIPTION OF EMBODIMENTS OF THE TECHNOLOGY

While the present technology is described herein with illustrative embodiments for particular applications, it should be understood that the technology is not limited thereto. Those skilled in the art with access to the teachings provided herein will recognize additional modifications, applications, and embodiments within the scope thereof and additional fields in which the technology would be of significant utility.

The present disclosure discloses a thermal-assisted method for plastically deforming a high-strength material. The high-strength material may be a cold rolled sheet metal, for example aluminum of strength greater than 300 megapascal (MPa), preferably greater than 500 MPa, or steel of strength greater than 1000 MPa, preferably greater than 1500 MPa. The cold rolled sheet metal is locally heated just before bending to a temperature within the two-phase sub-critical temperature region or above the critical temperature, but preferably above the critical temperature, and is followed by rapid quenching after bending.

Figure 1:
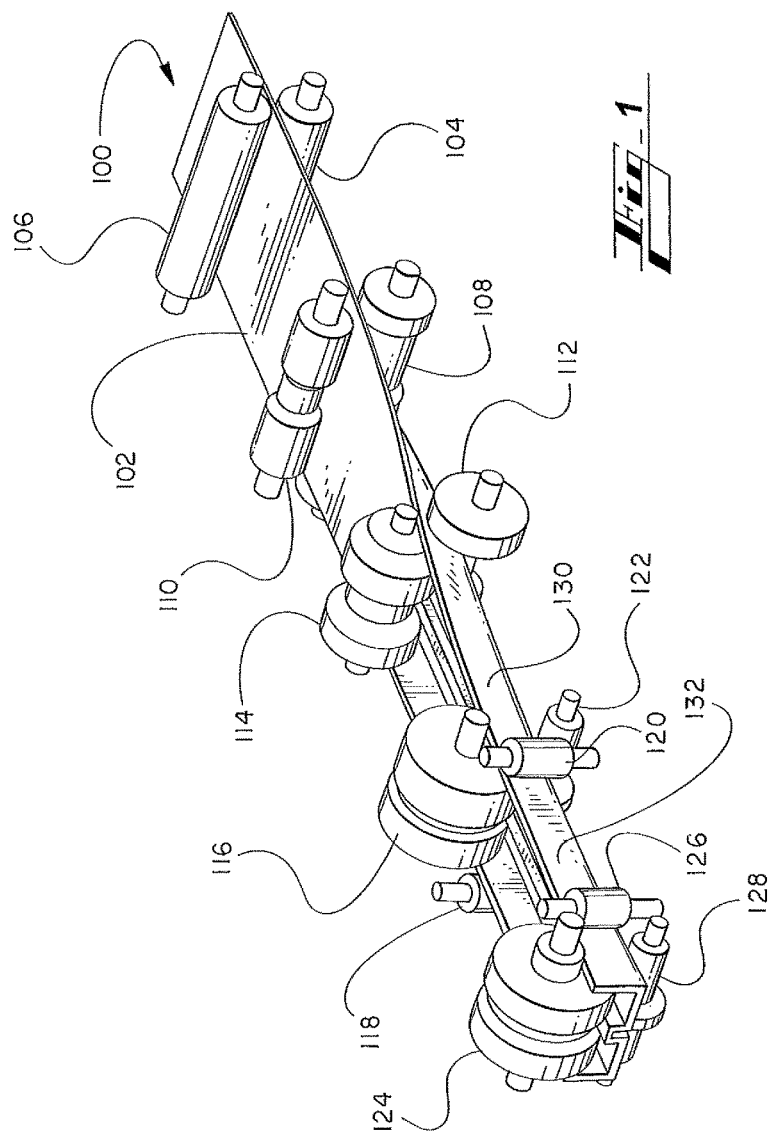
FIG. 1 is a schematic 100 for bending a sheet material according to one embodiment of the present technology.

FIG. 1 is a schematic 100 for roll forming a sheet material according to one embodiment of the present technology. A high-strength cold rolled sheet metal 102 is continuously fed through two parallel rollers 104, 106 on a roll-forming production line. This cold rolled sheet metal 102 is bent plastically into a desired shape through several bending steps, each bending step is performed with multiple roller dies. The cold rolled sheet metal 102 first passes through two roller dies 108, 110, the roller dies 108, 110 having different shapes. The cold rolled sheet 102 continues through another set of roller dies 112, 114, which will further bend the edges of the cold rolled sheet 102.

As bending continues, the high-strength cold rolled sheet metal 102 tends to resist, thus making it harder to further bend the cold rolled sheet metal 102. One or more high intensity laser sources 130 can be placed nearby and/or just before the next set of roller dies 116, 118, 120, and 122. The laser beam from the laser source 130 provides intense heat locally to an area subject to bending and heating that area to a temperature within the two-phase sub-critical temperature region or preferably above the critical temperature.

Because of the intense heating, the cold rolled sheet metal 102 can be bent at a radius that is 1 to 2 times the thickness of the cold rolled sheet metal 102. The heating is followed by a rapid quenching after the roller dies. The rapid quenching can be done through a plurality of cold air jets 132 and also through quenching by contact. The rapid quenching avoids precipitation or any transformation in the cold rolled sheet metal 102. After the heating and quenching, the roll forming may continue with another set of roller dies, 124, 126, and 128. The rapid quench allows the alloys that demonstrate subsequent precipitation hardening, such as aluminum or magnesium, to retain the high temperature phase structure at room temperature; the high temperature phase will transform upon reaching room temperature to other higher strength phases, such as retained austenite, martensite, and/or bainite as in the case of steels.

The laser source 130 described above is one example of the heating source. Rapid quenching is applied after heating and bending. Other examples of heating maybe induction, flame, focused halogen, or high intensity infra-red sources. Another possible heating method is resistance heating, in which a current would pass from one roller tool in contact with one side of the sheet through the sheet thickness to a second roller in contact with the other side of the sheet. The resistance of the material to the flow of electrical current is what causes the heating effect. The heating is then used to assist the bending of the sheet material. Yet another possible localized heating method for roll forming metallic materials is conduction heating. For example, the set of roller 116, 118, 120, and 122 may be heated by external sources (not shown), such that the material is heated by contact and bent as the material passes through these roller dies. Rapid quenching is applied after heating and bending in all cases.

FIG. 2 is another schematic 200 for roll forming a sheet material according to an alternative embodiment of the present technology. The roll forming shown in FIG. 2 is to heat from the inside due to convenience of process or geometry as desired. For example, the cold rolled sheet metal 202 may have some openings 204 done through some stamping process. A heat source, preferably laser, is used to heat locally the cold rolled sheet metal 202 just before bending through a plurality of rollers 206.

Because of high intensity heating according to the present technology, the cold rolled sheet metal can be bent to a small radius that is one to three times the thickness of the material. FIG. 3 is an illustration 300 of a bending angle. The cold rolled sheet metal 304 is heated by a heat source directed to a bending area 302, preferably laser, just before bending starts. Because of elasticity of the cold rolled sheet metal during bending, the cold rolled sheet metal 304 tends to spring back after bending. So, the resulting radius $R_f$ 308 is greater than the bending radius $R_t$ 306 that is provided by the tooling. The use of intense laser heating with the present technology can essentially eliminate the springback action of the cold rolled sheet material since springback is related to strength and the strength during bending at temperature is greatly reduced. The result is that the final radius $R_f$ 308 is virtually similar to what is provided by the tool without the need for any post processing. The resulting radius $R_f$ 308 with the present technology can be between one to three times the thickness h 310 of the cold rolled sheet metal 304.

FIG. 4 is a flowchart 400 for a metal forming process according to the present technology. The cold rolled sheet metal is fed into the production line, step 402, and, as the cold rolled sheet metal approaches the bending point, a heat source, preferably laser, heats the sheet metal to a solutionizing or austenitizing temperature, step 404. The cold rolled sheet metal is bent, step 406, and then goes through rapid quenching, step 408. The quenching may be done by contact with roller tools, self-quench from the mass of the cold rolled sheet metal, air jet, gas jet, or a combination of these quenching methods. An additional paint bake cycle, step 410, may be added for hardening through precipitation of the quenched material before the process ends, step 412.

Figure 5:
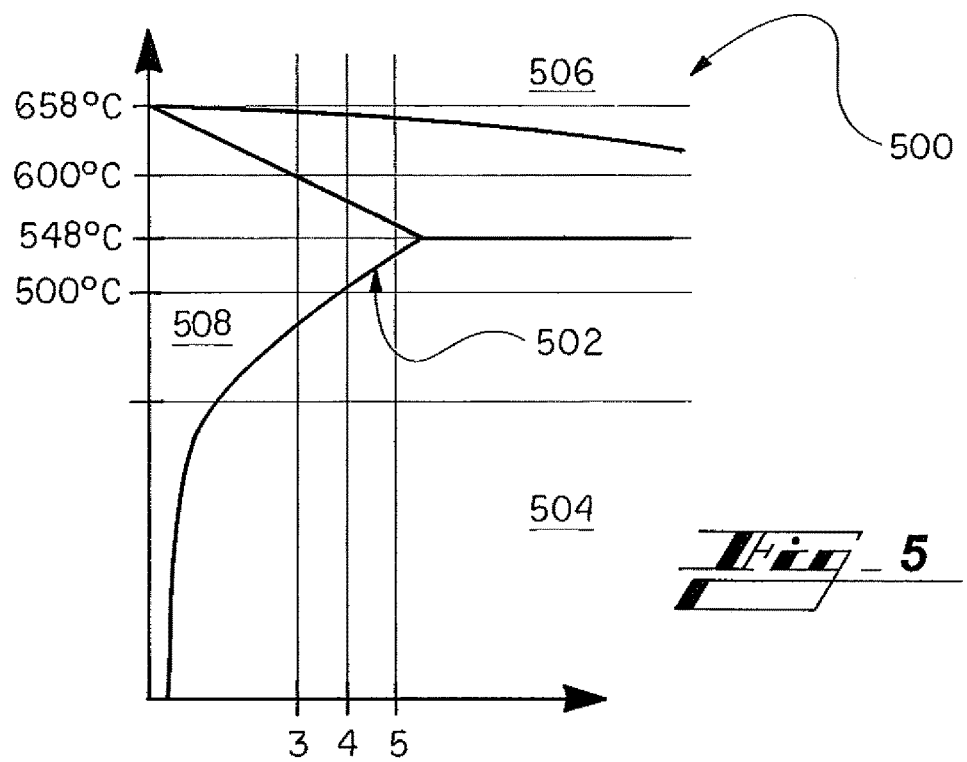
FIG. 5 is an aluminum-copper phase diagram showing temperatures up to which the corner can be heated just prior to bending.
Figure 6:
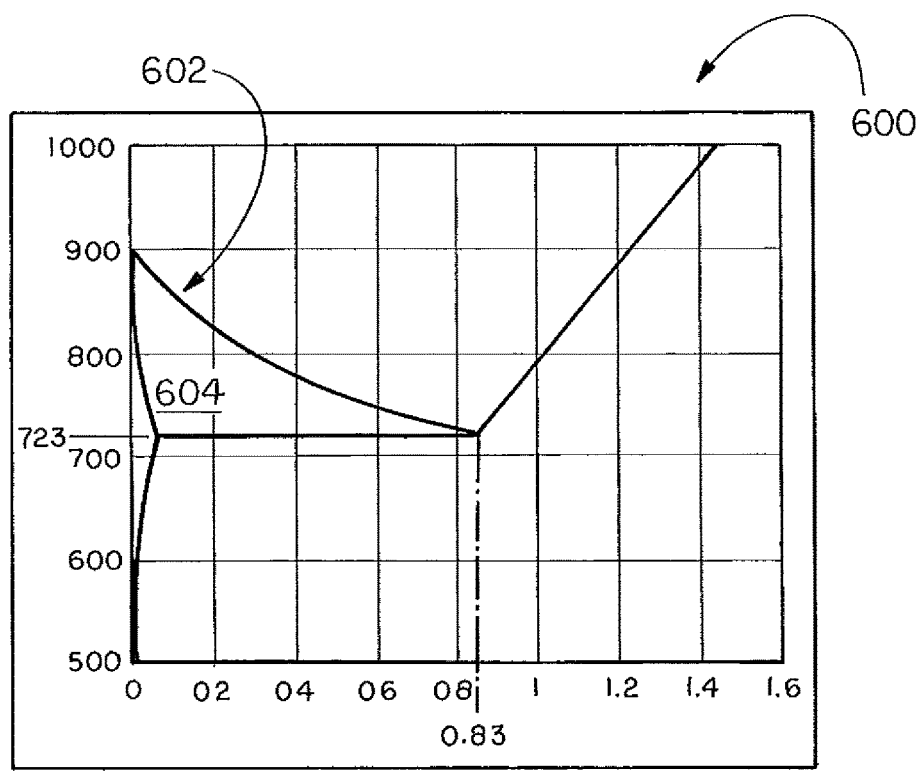
FIG. 6 is an iron-carbon phase diagram showing temperatures up to which the corner can be heated just prior to bending.

FIG. 5 is an aluminum-copper phase diagram 500 showing the critical temperature line 502 as function of percentage of copper and a two-phase sub-critical temperature region 504. FIG. 6 is an iron-carbon phase diagram 600 showing the critical temperatures line 602 as function of percentage of carbon and a two-phase sub-critical temperature region 604.

The thermal-assisted forming process of the present technology is especially applicable to the automobile industry. For example, the production of rockers for automobiles can be improved by pre-heating the alloy before bending. The strength of rocker can be improved from 1.5 GPa to 2 GPa. The bumper design can also be improved with the present technology. The radius for the corner for a bumper is approximately 4 times thickness and the thermal-assisted forming process can reduce the radius to approximately 2 times thickness without sacrificing any strength. Because of the strength increase obtained from cold rolled material, and because the rapid cooling of the bent region can be hardened, it becomes possible to change the bumper material from steel to aluminum, which will make the bumper lighter and also reduce the cost.

The process described above enables production of a constant cross-section for automobile bumpers or other structural parts. The tight radius of the bending corner reduces the packaging space of the final products. This method allows use of cheap lower alloy cold rolled sheet in the production of these parts. This method can also reduce the number or rollers required and hence reduce the length of the total straight line of the manufacturing facility.

Though the present description uses laser as the heat source, it is understood that other types of heat source, such as induction, infrared light, resistance heating, may also be used. Features described in different embodiments described in the present specification may be combined.

It is to be appreciated that the Detailed Description section, and not the Summary and Abstract sections, is intended to be used to interpret the claims. The Summary and Abstract sections may set forth one or more but not all exemplary embodiments of the present technology as contemplated by the inventor(s), and thus, are not intended to limit the present technology and the appended claims in any way.

What is claimed is:

1. A process, for roll forming high-strength cold-rolled sheet metal in a roll-forming production line having heated rollers and cooling rollers, comprising:

feeding the high-strength cold-rolled sheet metal, having a yield strength of at least 1,500 Megapascals, continuously between rollers on the roll-forming production line;

directing, by conduction heating, intense heat to a focus bending area, of the high-strength cold-rolled sheet metal, subject to present bending in the roll-forming production line, to raise a focus-bending-area temperature to a solutionizing temperature for the high-strength cold-rolled sheet metal, wherein the conduction heating comprises heating at least two pair of adjacent heated rollers, of the rollers of the roll-forming production line, and contacting the high-strength cold-rolled sheet metal with the at least two pair of adjacent heated rollers, so as to raise the focus-bending-area temperature to the solutionizing temperature for the high-strength cold-rolled sheet metal;

bending, at the focus bending area heated, during the conduction heating at the focus bending area, the high-strength cold-rolled sheet metal solutionalized; and quenching the focus bending area of the high-strength cold-rolled sheet metal rapidly and immediately after bending for the cold-rolled sheet metal, to retain a high-temperature phase structure in the focus area of the high-strength cold-rolled sheet metal at room temperature, wherein the quenching comprises (i) cooling at least two pair of adjacent cooling rollers, of the rollers of the roll-forming production line, closely downstream of the heated rollers in the production line, and (ii) contacting the high-strength cold-rolled sheet metal with the at least two pair of adjacent cooling rollers, so as to, promptly after the bending, quench the focus-bending-area temperature of the high-strength cold-rolled sheet metal.

2. The process of claim 1, wherein the quenching, using the cooling rollers, causes formation of bainite in the high-strength cold-rolled sheet metal.

3. The process of claim 1, wherein the quenching, using the cooling rollers, causes formation of retained austenite in the high-strength cold-rolled sheet metal.

4. The process of claim 1, wherein bending the high-strength cold-rolled sheet metal further comprises bending, using the heating rollers, the high-strength cold-rolled sheet metal to a radius less than three times a thickness of the high-strength cold-rolled sheet metal.

5. The process of claim 1, wherein bending the high-strength cold-rolled sheet metal further comprises bending, using the heating rollers, the high-strength cold-rolled sheet metal to a radius equaling approximately to a thickness of the high-strength cold-rolled sheet metal.

6. The process of claim 1, being for roll forming of high-strength cold-rolled sheet metal and for implementing the high-strength cold-rolled sheet metal into an automobile component, further comprising forming the high-strength cold-rolled sheet metal into a bumper or a rocker for an automobile.

7. A process, for roll forming high-strength cold-rolled sheet metal in a roll-forming production line having electric heating rollers and cooling rollers, comprising:

feeding the high-strength cold-rolled sheet metal, having a yield strength of over 1,500 Megapascals, continuously between rollers on the roll-forming production line;

fostering, using the electric heating rollers, intense heat at a focus bending area, of the high-strength cold-rolled sheet metal, subject to present bending in the roll-forming production line, to raise a focus-bending-area temperature to a solutionizing temperature for the high-strength cold-rolled sheet metal, yielding resistance heating, wherein the resistance heating comprises directing electrical current to pass from a first of the electric heating rollers to a second of the electric heating rollers, and so through the focus bending area of the high-strength cold-rolled sheet metal moving between the first electric heating roller and the second electric heating roller, thereby heating the focus bending area to raise the focus-bending-area temperature to the solutionizing temperature for the high-strength cold-rolled sheet metal;

bending, at the focus bending area heated, during the resistance heating at the focus bending area, the high-strength cold-rolled sheet metal solutionalized; and quenching the focus bending area of the high-strength cold-rolled sheet metal rapidly and immediately after bending for the cold-rolled sheet metal, to retain a high-temperature phase structure in the focus area of the high-strength cold-rolled sheet metal at room temperature, wherein the quenching comprises (i) cooling at least two pair of adjacent cooling rollers, of the rollers of the roll-forming production line, closely downstream of the heating rollers in the production line, and (ii) contacting the high-strength cold-rolled sheet metal with the at least two pair of adjacent cooling rollers, so as to, promptly after the bending, quench the focus-bending-area temperature of the high-strength cold-rolled sheet metal.

8. The process of claim 7, wherein the quenching, using the cooling rollers, causes formation of bainite in the cold-rolled sheet metal.

9. The process of claim 7, wherein the quenching, using the cooling rollers, causes formation of retained austenite in the cold-rolled sheet metal.

10. The process of claim 7, wherein bending, using the heating rollers, the cold-rolled sheet metal further comprises bending the cold-rolled sheet metal to a radius less than three times a thickness of the cold-rolled sheet metal.

11. The process of claim 7, wherein bending, using the heating rollers, the cold-rolled sheet metal further comprises bending the cold-rolled sheet metal to a radius equaling approximately to a thickness of the cold-rolled sheet metal.

12. A process, for roll forming high-strength cold-rolled sheet metal in a roll-forming production line having heating rollers, comprising:

feeding the high-strength cold-rolled sheet metal continuously between rollers on the roll-forming production line;

fostering, using the heating rollers, intense heat at a focus bending area, of the high-strength cold-rolled sheet metal, subject to present bending in the roll-forming production line, to raise a focus-bending-area temperature to at least a critical temperature for the high-strength cold-rolled sheet metal;

bending, at the focus bending area heated, during the conduction heating at the focus bending area, the high-strength cold-rolled sheet metal heated; and quenching the focus bending area of the high-strength cold-rolled sheet metal rapidly and immediately after bending for the cold-rolled sheet metal, to retain a high-temperature phase structure for the focus area of the high-strength cold-rolled sheet metal at room temperature.

13. The process of claim 12, wherein:

the roll-forming production line comprises cooling rollers; and the quenching comprises (i) cooling at least two pair of adjacent cooling rollers, of the rollers of the roll-forming production line, closely downstream of the heated rollers in the production line, and (ii) contacting the high-strength cold-rolled sheet metal with the at least two pair of adjacent cooling rollers, so as to, promptly after the bending, quench the focus-bending-area temperature of the high-strength cold-rolled sheet metal.

14. The process of claim 12, wherein:

the heating rollers are electric heating rollers; and fostering the intense heat comprises directing electrical current to pass from a first of the heating rollers to a second of the heating rollers, and so through the focus bending area of the high-strength cold-rolled sheet metal moving between the first heating roller and the second heating roller, thereby heating the focus bending area to raise the focus-bending-area temperature to or above the critical temperature for the high-strength cold-rolled sheet metal.

15. The process of claim 12, wherein:

the heating rollers comprises at least one pair of adjacent heated rollers; and fostering the intense heat to the focus bending area comprises heating the pair of adjacent heated rollers, and contacting the high-strength cold-rolled sheet metal with the pair of adjacent heated rollers, so as to raise the focus-bending-area temperature to the solutionizing temperature for the high-strength cold-rolled sheet metal.

16. The process of claim 12, wherein the quenching comprises separating the high-strength cold rolled sheet metal from the heated or heating rollers, and allowing a cooler mass of the high-strength cold rolled sheet metal, being cooler than the focus area in bending, to quench the heated focus area.

17. The process of claim 12, wherein the quenching, using the cooling rollers, causes formation of bainite in the cold-rolled sheet metal.

18. The process of claim 12, wherein the quenching, using the cooling rollers, causes formation of retained austenite in the cold-rolled sheet metal.

19. The process of claim 12, wherein bending the cold-rolled sheet metal further comprises bending, using the heating rollers, the cold-rolled sheet metal to a radius less than three times a thickness of the cold-rolled sheet metal.

20. The process of claim 12, wherein bending the cold-rolled sheet metal further comprises bending, using the heating rollers, the cold-rolled sheet metal to a radius equaling approximately to a thickness of the cold-rolled sheet metal.

\* \* \* \* \*